(12) United States Patent
Cheng (10) Patent No.: US 8,427,065 B2
(45) Date of Patent: Apr. 23, 2013

(54) DRIVING CIRCUIT FOR LIGHT EMITTING ELEMENTS

(75) Inventor: Ching-Chi Cheng, Taipei (TW)

(73) Assignee: Advanced-Connectek Inc., Taipei (TW)

( * ) Notice: Subject to any disclaimer, the term of this patent is extended or adjusted under 35 U.S.C. 154(b) by 85 days.

(21) Appl. No.: 13/246,223

(22) Filed: Sep. 27, 2011

(65) Prior Publication Data

US 2012/0074857 A1    Mar. 29, 2012

(30) Foreign Application Priority Data

Sep. 27, 2010 (TW) ................................ 99132666 A (51) Int. Cl.
*H05B 41/16* (2006.01)
(52) U.S. Cl.
USPC ........ 315/247; 315/291; 315/307; 315/185 S; 315/312
(58) Field of Classification Search ................... 315/247, 315/224, 291, 307–326
See application file for complete search history.

(56) References Cited

U.S. PATENT DOCUMENTS

| | | | |
|---|---|---|---|
| 6,989,701 | B2 | 1/2006 | Lin et al. |
| 7,741,788 | B2 * | 6/2010 | Ito et al. ........................ 315/247 |
| 7,999,484 | B2 * | 8/2011 | Jurngwirth et al. ........... 315/247 |
| 8,154,214 | B2 * | 4/2012 | Kuroki et al. ................. 315/247 |
| 2008/0068298 | A1 | 3/2008 | Shen et al. |
| 2009/0212721 | A1 | 8/2009 | Maruyama |

FOREIGN PATENT DOCUMENTS

| | | |
|---|---|---|
| EP | 2257123 | 12/2010 |
| JP | 58-014584 A | 1/1983 |
| JP | 61-094386 A | 5/1986 |
| JP | 62-268321 A | 11/1987 |
| JP | 05-191568 A | 7/1993 |
| JP | 2003-059676 A | 2/2003 |
| JP | 2005-302712 A | 10/2005 |
| JP | 2009-026544 A | 2/2009 |
| JP | 2010-103391 A | 5/2010 |
| KR | 20100126166 A | 12/2010 |
| WO | WO-2007144365 A1 | 12/2007 |

OTHER PUBLICATIONS

Korea Patent Office, Office Action, Feb. 28, 2013, Korea.
Japan Patent Office, Office Action, Mar. 5, 2013, Japan.

* cited by examiner

*Primary Examiner* — Tuyet Thi Vo
(74) *Attorney, Agent, or Firm* — Rabin & Berdo, P.C.

(57) ABSTRACT

A driving circuit for light emitting elements comprises a rectifying unit, a first constant current unit, a first driving transistor, a first voltage control unit and at least one first light emitting element. The rectifying unit has a first terminal and a second terminal, is connected to an external power source that provides alternating current power that is sinusoidal and has alternating negative and positive segments, inverts the negative segments of the AC power to positive segments and forms a pulsating direct current voltage. The first constant current unit has a first end and a second end. The first driving transistor comprises a first gate, a first drain and a first source. The first voltage control unit comprises a first variable resistor and a first bias control element. The first light emitting element has a first end and a second end.

14 Claims, 6 Drawing Sheets

DRIVING CIRCUIT FOR LIGHT EMITTING ELEMENTS

FIELD OF THE INVENTION

The present invention is a driving circuit for light emitting elements.

BACKGROUND OF THE INVENTION

Prior art for dimming technology of light-emitting elements uses pulse width modulation (PWM) to convert analog signals to digital pulses, controls an on/off time ratio of light-emitting elements and then divides into some levels. Subsequently, the light-emitting elements will display the values of bright gray scale relatively. Thus, providing a width change on a digital pulse can change output current to adjust brightness of the light-emitting elements.

U.S. Pat. No. 6,989,701 discloses a PWM driving apparatus for a light emitting diode (LED) includes a saw tooth wave generator for generating a saw tooth wave signal, a comparator, a field effect transistor (FET), a first resistor, a second resistor, a power supply and an LED array. A modulation signal is provided by a modulation signal source and the saw tooth wave signal is fed to the comparator. An output of the comparator is connected to a gate terminal of the FET. The power supply is connected to a source terminal of the FET through the first resistor. A drain terminal of the FET outputs a driving current through the second resistor to the LED array.

However, the foregoing PWM driving apparatus easily causes a driving circuit of the white light-emitting elements produces a noise that the human ear can hear, because frequency of a PWM signal in the range 200 Hz to 20 kHz can be heard by the human ear. When the PWM signal is low, the driving circuit for light-emitting elements stops working. The output capacitance passes through white light-emitting elements and then discharges with the bottom resistors. Therefore, when using PWM to dim the light, the output capacitance inevitably produces large ripple. In addition, efficiency of a small duty cycle is lower when using PWM to control duty cycle.

Accordingly, a new driving circuit for light emitting elements is needed to adjust resistance of a variable resistor via a microprocessor or a mechanical method and control brightness of light emitting elements by using an analog method.

SUMMARY OF THE INVENTION

The primary objective of the present invention is to adjust resistance of a variable resistor with a microprocessor or a mechanical method and control brightness of light emitting elements with an analog method.

A driving circuit for light emitting elements in accordance with the present invention comprises a rectifying unit, a first constant current unit, a first driving transistor, a first voltage control unit and at least one first light emitting element.

The rectifying unit has a first terminal and a second terminal, is connected to an external power source that provides alternating current (AC) power being sinusoidal and having alternating negative and positive segments, inverts the negative segments of the AC power to positive segments and forms a pulsating direct current (DC) voltage.

The first constant current unit has a first end and a second end. The first driving transistor comprises a first gate, a first drain and a first source. The first gate connects to the second end of the first constant current unit. The first drain connects to the first terminal of the rectifying unit and the first end of the first constant current unit. The first source outputs a driving current according to a voltage between the first gate and the first source.

The first voltage control unit comprises a first variable resistor and a first bias control element. The first variable resistor has a variable resistance controlling the driving current of the first driving transistor and has a first terminal and a second terminal. The first terminal connects to the first source. The first bias control element controls the voltage between the first gate and the first source according to the driving current of the first driving transistor and has a first end and a second end. The first end connects to the first gate. The second end connects to the second terminal of the first variable resistor.

The first light emitting element has a first end and a second end. The first end connects to the second terminal of the first variable resistor. The second end connects to the second terminal of the rectifying unit.

DETAILED DESCRIPTION OF THE PRESENT INVENTION

Figure 1:
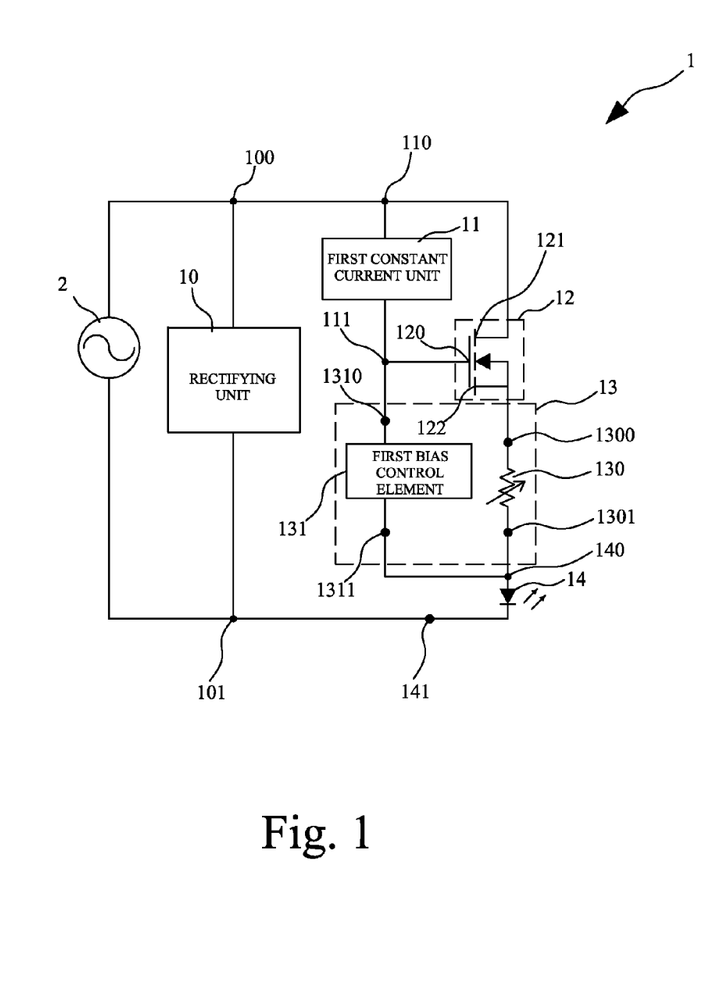
FIG. 1 is a driving circuit for light emitting elements in accordance with the present invention.
Figure 2:
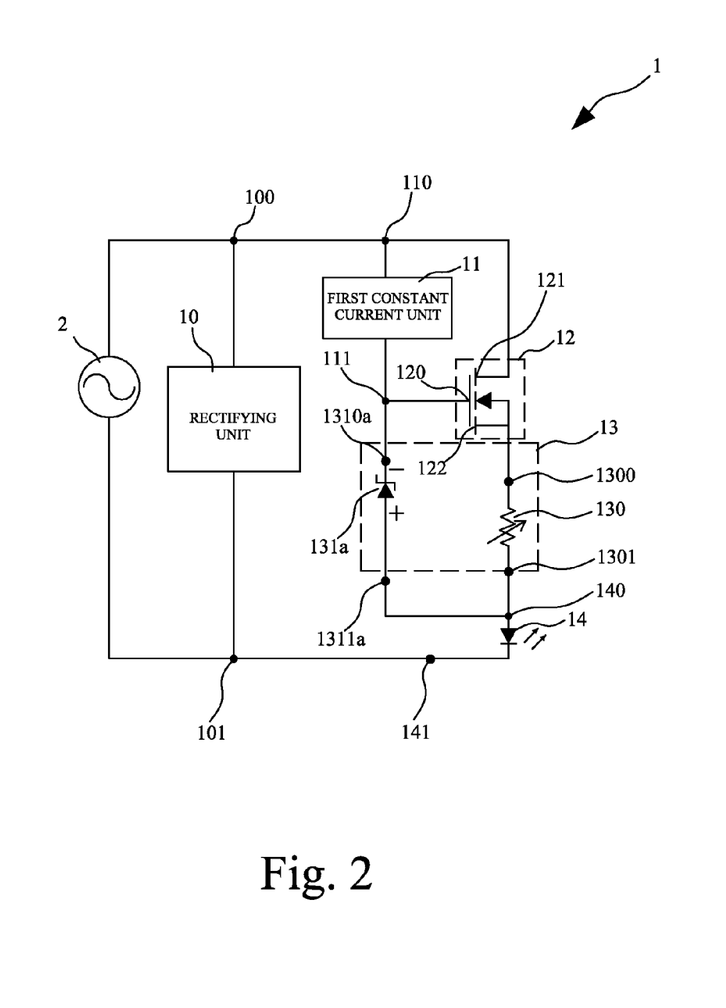
FIG. 2 is a circuit diagram of a first embodiment of a limiting current circuit in FIG. 1.
Figure 3:
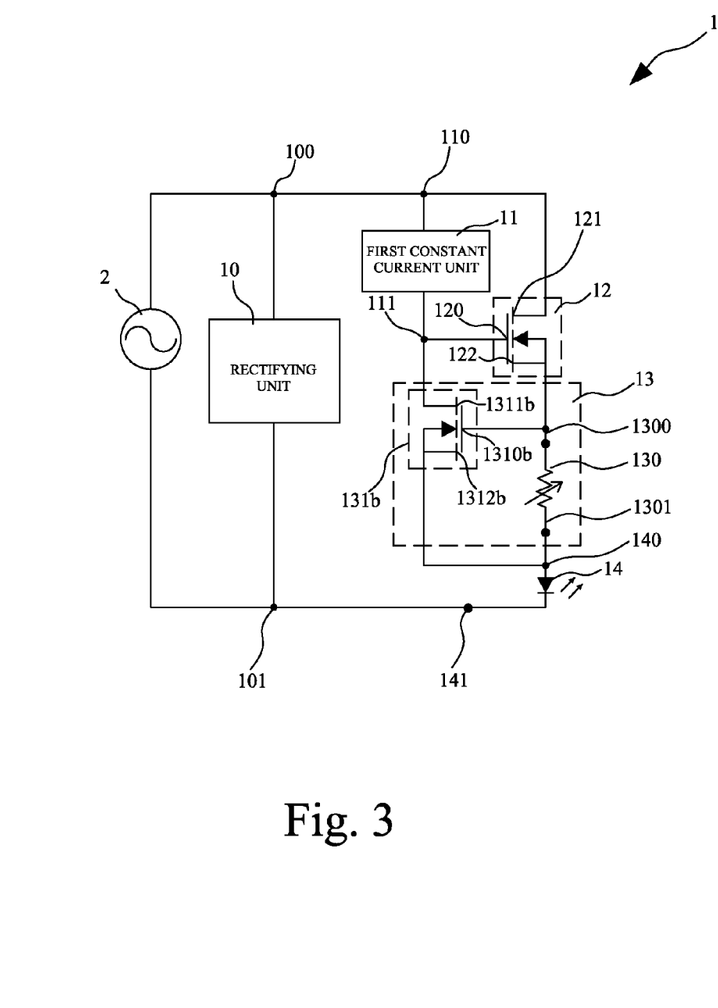
FIG. 3 is a circuit diagram of a second embodiment of a limiting current circuit in FIG. 1.
Figure 4:
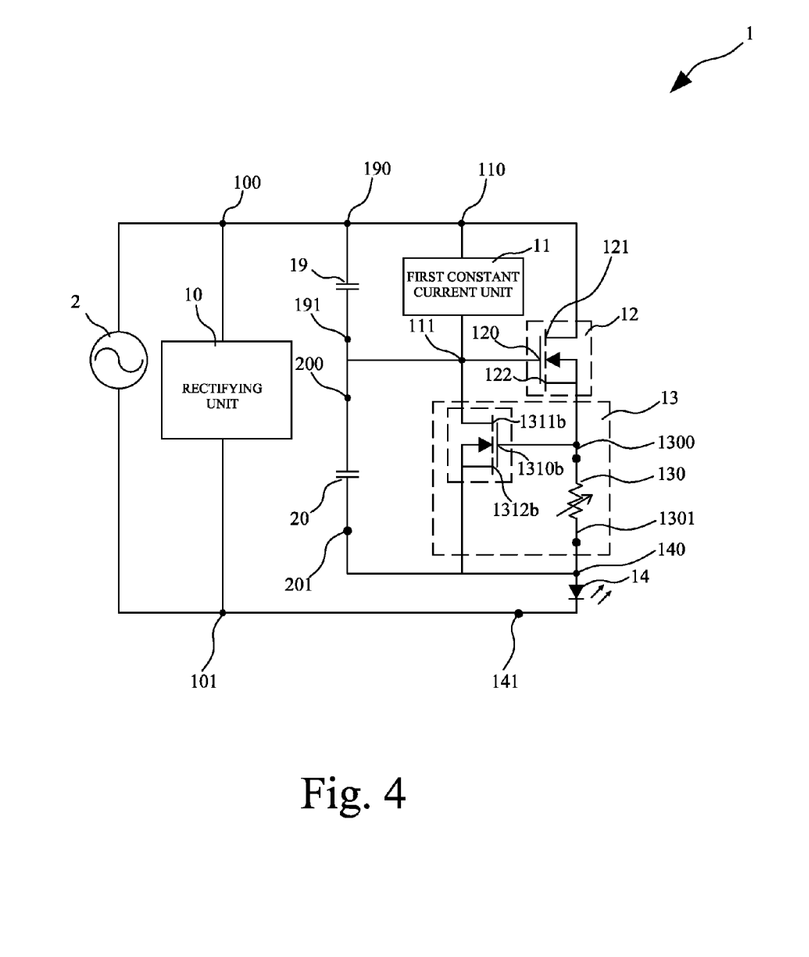
FIG. 4 is a circuit diagram of a third embodiment of a limiting current circuit in FIG. 1.
Figure 5:
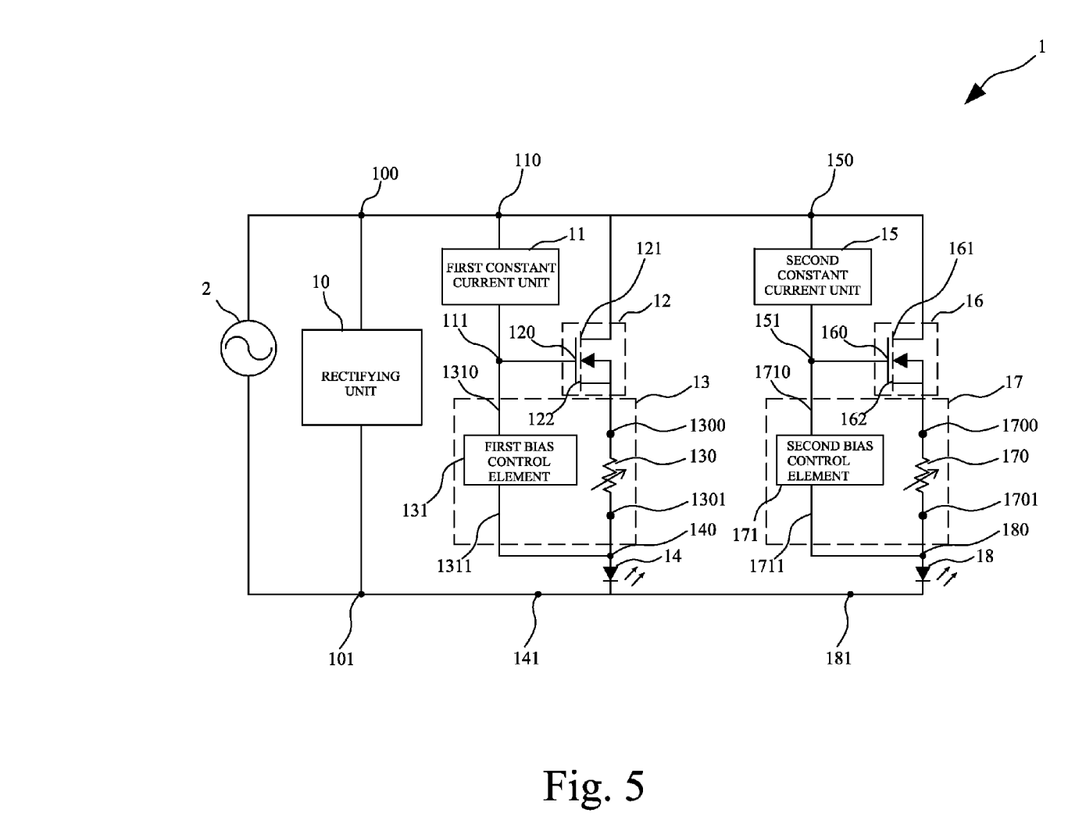
FIG. 5 is a circuit diagram of a fourth embodiment of a limiting current circuit in FIG. 1.
Figure 6:
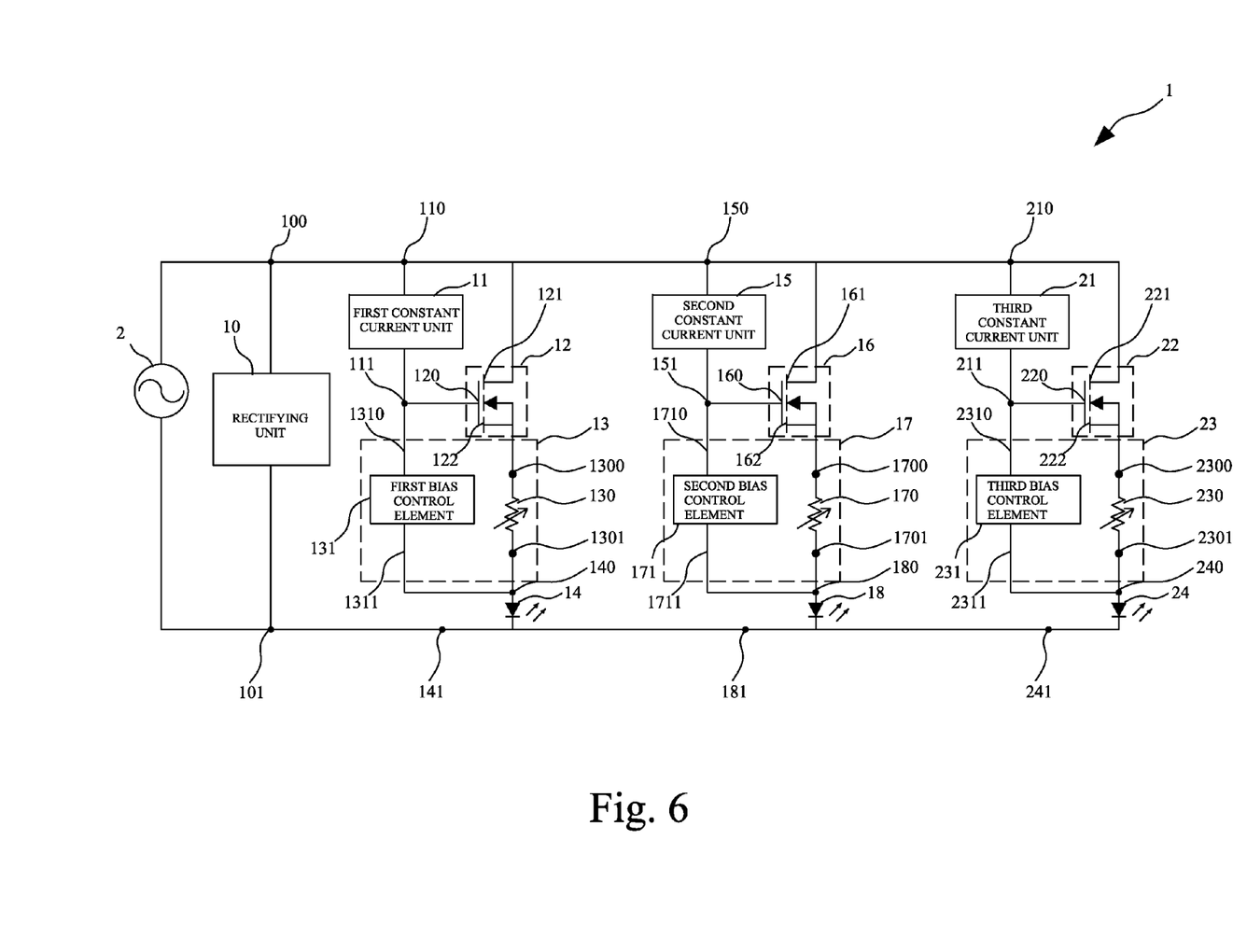
FIG. 6 is a circuit diagram of a fifth embodiment of a limiting current circuit in FIG. 1.

With reference to FIGS. 1 to 6, a driving circuit for light emitting elements (1) in accordance with the present invention comprises a rectifying unit (10), a first constant current unit (11), a first driving transistor (12), a first voltage control unit (13), at least one first light emitting element (14), an optional second constant current unit (15), an optional second driving transistor (16), an optional second voltage control unit (17), at least one optional second light emitting element (18), an optional first capacitor (19), an optional second capacitor (20), an optional third constant current unit (21), an optional third driving transistor (22), an optional third voltage control unit (23) and at least one optional third light emitting element (24).

The rectifying unit (10) has a first terminal (100) and a second terminal (101), is connected to an external power source (2) that provides alternating current (AC) power being sinusoidal and having alternating negative and positive segments, inverts the negative segments of the AC power to positive segments and forms a pulsating direct current (DC) voltage.

The first constant current unit (11) has a first end (110) and a second end (111) and may be a bias feedback resistor or a current regulating diode. The bias feedback resistor has a variable resistance.

The first driving transistor (12) comprises a first gate (120), a first drain (121) and a first source (122). The first gate (120) connects to the second end (111) of the first constant current unit (11). The first drain (121) connects to the first terminal (100) of the rectifying unit (10) and the first end (110) of the first constant current unit (11). The first source (122) outputs a driving current according to a voltage between the first gate (120) and the first source (122).

The first voltage control unit (13) comprises a first variable resistor (130) and a first bias control element (131).

The first variable resistor (130) has a variable resistance controlling the driving current of the first driving transistor (12) and has a first terminal (1300) and a second terminal (1301). The variable resistance of the first variable resistor (130) may be adjusted by a microprocessor or a mechanical method. The first terminal (1300) connects to the first source (122).

The first bias control element (131) controls the voltage between the first gate (120) and the first source (122) according to the driving current of the first driving transistor (12), has a first end (1310) and a second end (1311) and may be a zener diode (131a) or an n type metal oxide semiconductor field effect transistor (nMOSFET) (131b). The first end (1310) connects to the first gate (120). The second end (1311) connects to the second terminal (1301) of the first variable resistor (130).

The zener diode (131a) has an anode (1311a) and a cathode (1310a). The anode (1311a) connects to the second terminal (1301) of the first variable resistor (130). The cathode (1310a) connects to the first gate (120).

The nMOSFET (131b) comprises a gate (1310b), a drain (1311b) and a source (1312b). The gate (1310b) of the nMOSFET (131b) connects to the first terminal (1300) of the first variable resistor (130). The drain (1311b) of the nMOSFET (131b) connects to the first gate (120). The source (1312b) of the nMOSFET (131b) connects to the second terminal (1301) of the first variable resistor (130).

The first light emitting element (14) has a first end (140) and a second end (141) and may be a red light emitting element, an organic LED, an LED or an electroluminance element. The first end (140) connects to the second terminal (1301) of the first variable resistor (130). The second end (141) connects to the second terminal (101) of the rectifying unit (10).

The second constant current unit (15) has a first end (150) and a second end (151).

The second driving transistor (16) comprises a second gate (160), a second drain (161) and a second source (162). The second gate (160) connects to the second end (151) of the second constant current unit (15). The second drain (161) connects to the first terminal (100) of the rectifying unit (10) and the first end (150) of the second constant current unit (15). The second source (162) outputs a driving current according to a voltage between the second gate (160) and the second source (162).

The second voltage control unit (17) comprises a second variable resistor (170) and a second bias control element (171).

The second variable resistor (170) has a variable resistance controlling the driving current of the second driving transistor (16) and having a first terminal (1700) and a second terminal (1701). The first terminal (1700) connects to the second source (162).

The second bias control element (171) controls the voltage between the second gate (160) and the second source (162) according to the driving current of the second driving transistor (16) and has a first end (1710) and a second end (1711). The first end (1710) connects to the second gate (160). The second end (1711) connects to the second terminal (1701) of the second variable resistor (170).

The second light emitting element (18) has a first end (180) and a second end (181) and may be a green light emitting element, an organic LED, an LED or an electroluminance element. The first end (180) connects to the second terminal (1701) of the second variable resistor (170). The second end (181) connects to the second terminal (101) of the rectifying unit (10).

The first capacitor (19) has a first end (190) and a second end (191). The first end (190) connects to the first end (110) of the first constant current unit (11). The second end (191) connects to the second end (111) of the first constant current unit (11).

The second capacitor (20) has a first end (200) and a second end (201). The first end (200) connects to the first gate (120). The second end (201) connects to the second terminal (1301) of the first variable resistor (130).

The third constant current unit (21) has a first end (210) and a second end (211).

The third driving transistor (22) comprises a third gate (220), a third drain (221) and a third source (222). The third gate (220) connects to the second end (211) of the third constant current unit (21). The third drain (221) connects to the first terminal (100) of the rectifying unit (10) and the first end (210) of the third constant current unit (21). The third source (222) outputs a driving current according to a voltage between the third gate (220) and the third source (222).

The third voltage control unit (23) comprises a third variable resistor (230) and a third bias control element (231).

The third variable resistor (230) has a variable resistance controlling the driving current of the third driving transistor (22) and has a first terminal (2300) and a second terminal (2301). The first terminal (2300) connects to the third source (222).

The third bias control element (231) controls the voltage between the third gate (220) and the third source (222) according to the driving current of the third driving transistor (22) and has a first end (2310) and a second end (2311). The first end (2310) connects to the third gate (220). The second end (2311) connects to the second terminal (2301) of the third variable resistor (230).

The third light emitting element (24) has a first end (240) and a second end (241), may be a blue light emitting element, an organic LED, an LED or an electroluminance element. The first end (240) connects to the second terminal (2301) of the third variable resistor (230). The second end (241) connects to the second terminal (101) of the rectifying unit (10).

Various changes can be made without departing from the broad spirit and scope of the invention.

What is claimed is:
1. A driving circuit for light emitting elements comprising
a rectifying unit having a first terminal and a second terminal, being connected to an external power source that provides alternating current (AC) power being sinusoidal and having alternating negative and positive segments, inverting the negative segments of the AC power to positive segments and forming a pulsating direct current (DC) voltage;
a first constant current unit having a first end and a second end;
a first driving transistor comprising
a first gate connecting to the second end of the first constant current unit;
a first drain connecting to the first terminal of the rectifying unit and the first end of the first constant current unit; and
a first source outputting a driving current according to a voltage between the first gate and the first source;
a first voltage control unit comprising a first variable resistor having a variable resistance controlling the driving current of the first driving transistor and having
a first terminal connecting to the first source; and
a second terminal; and
a first bias control element controlling the voltage between the first gate and the first source according to the driving current of the first driving transistor and having
a first end connecting to the first gate; and
a second end connecting to the second terminal of the first variable resistor; and
at least one first light emitting element having
a first end connecting to the second terminal of the first variable resistor; and
a second end connecting to the second terminal of the rectifying unit.

2. The driving circuit for light emitting elements as claimed in claim 1, wherein the first constant current unit is a bias feedback resistor having a variable resistance.

3. The driving circuit for light emitting elements as claimed in claim 1, wherein the first constant current unit is a current regulating diode.

4. The driving circuit for light emitting elements as claimed in claim 1, wherein the variable resistance of the first variable resistor is adjusted by a microprocessor.

5. The driving circuit for light emitting elements as claimed in claim 1, wherein the variable resistance of the first variable resistor is adjusted by a mechanical method.

6. The driving circuit for light emitting elements as claimed in claim 1, wherein the first bias control element is a zener diode having
an anode connecting to the second terminal of the first variable resistor; and
a cathode connecting to the first gate.

7. The driving circuit for light emitting elements as claimed in claim 1, wherein the first bias control element is an n type metal oxide semiconductor field effect transistor (nMOSFET) comprising
a gate connecting to the first terminal of the first variable resistor;
a drain connecting to the first gate; and
a source connecting to the second terminal of the first variable resistor.

8. The driving circuit for light emitting elements as claimed in claim 1, further comprising
a second constant current unit having a first end and a second end;
a second driving transistor comprising
a second gate connecting to the second end of the second constant current unit;
a second drain connecting to the first terminal of the rectifying unit and the first end of the second constant current unit; and
a second source outputting a driving current according to a voltage between the second gate and the second source;
a second voltage control unit comprising
a second variable resistor having a variable resistance controlling the driving current of the second driving transistor and having
a first terminal connecting to the second source; and
a second terminal; and
a second bias control element controlling the voltage between the second gate and the second source according to the driving current of the second driving transistor and having
a first end connecting to the second gate; and
a second end connecting to the second terminal of the second variable resistor; and
at least one second light emitting element having
a first end connecting to the second terminal of the second variable resistor; and
a second end connecting to the second terminal of the rectifying unit.

9. The driving circuit for light emitting elements as claimed in claim 7 further comprising
a first capacitor having
a first end connecting to the first end of the first constant current unit; and
a second end connecting to the second end of the first constant current unit; and
a second capacitor having
a first end connecting to the first gate; and
a second end connecting to the second terminal of the first variable resistor.

10. The driving circuit for light emitting elements as claimed in claim 8, further comprising
a third constant current unit having a first end and a second end;
a third driving transistor comprising
a third gate connecting to the second end of the third constant current unit;
a third drain connecting to the first terminal of the rectifying unit and the first end of the third constant current unit; and
a third source outputting a driving current according to a voltage between the third gate and the third source;
a third voltage control unit comprising
a third variable resistor having a variable resistance controlling the driving current of the third driving transistor and having
a first terminal connecting to the third source; and
a second terminal; and
a third bias control element controlling the voltage between the third gate and the third source according to the driving current of the third driving transistor and having
a first end connecting to the third gate; and
a second end connecting to the second terminal of the third variable resistor; and
at least one third light emitting element having
a first end connecting to the second terminal of the third variable resistor; and
a second end connecting to the second terminal of the rectifying unit.

11. The driving circuit for light emitting elements as claimed in claim 10, wherein the first light emitting element is a red light emitting element, the second light emitting element is a green light emitting element and the third light emitting element is a blue light emitting element.

12. The driving circuit for light emitting elements as claimed in claim 10, wherein the first light emitting element, the second light emitting element and the third light emitting element are organic light emitting diodes (LEDs).

13. The driving circuit for light emitting elements as claimed in claim 10, wherein the first light emitting element, the second light emitting element and the third light emitting element are LEDs.

14. The driving circuit for light emitting elements as claimed in claim 10, wherein the first light emitting element, the second light emitting element and the third light emitting element are electroluminance elements.

* * * * *